Dec. 31, 1957  J. F. WELLS  2,818,108
FLUID PRESSURE ACTUATED HEAVY DUTY TIRE
MOUNTING AND DEMOUNTING DEVICE
Filed Dec. 8, 1954  2 Sheets-Sheet 2
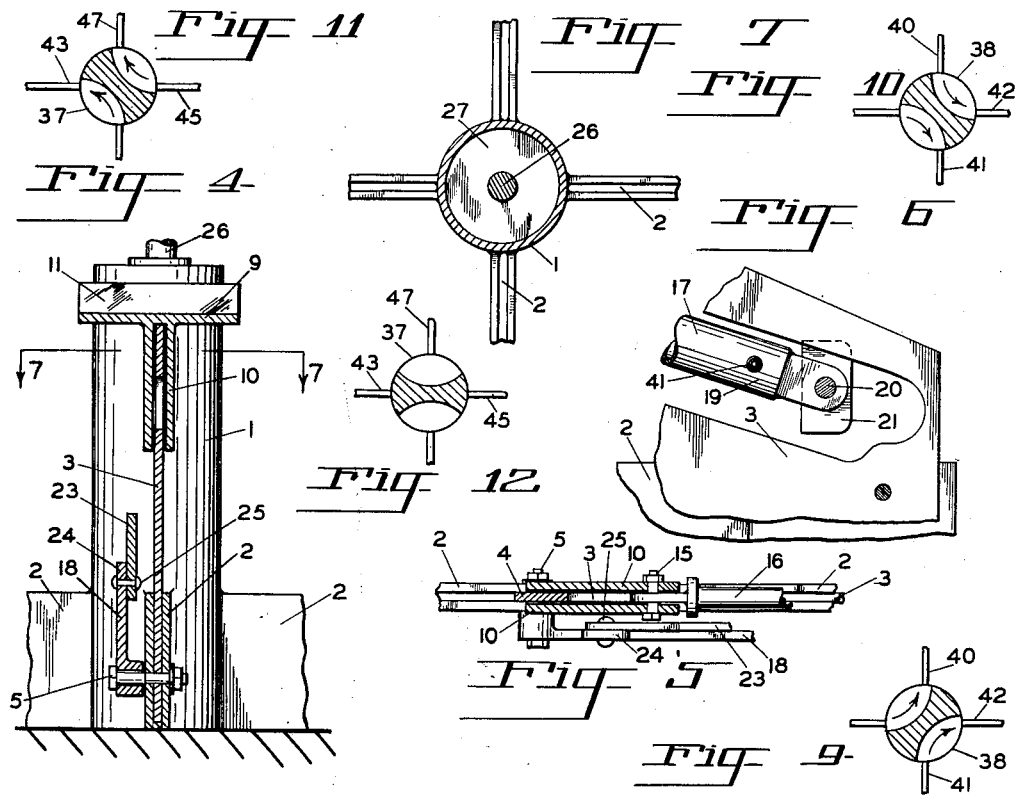
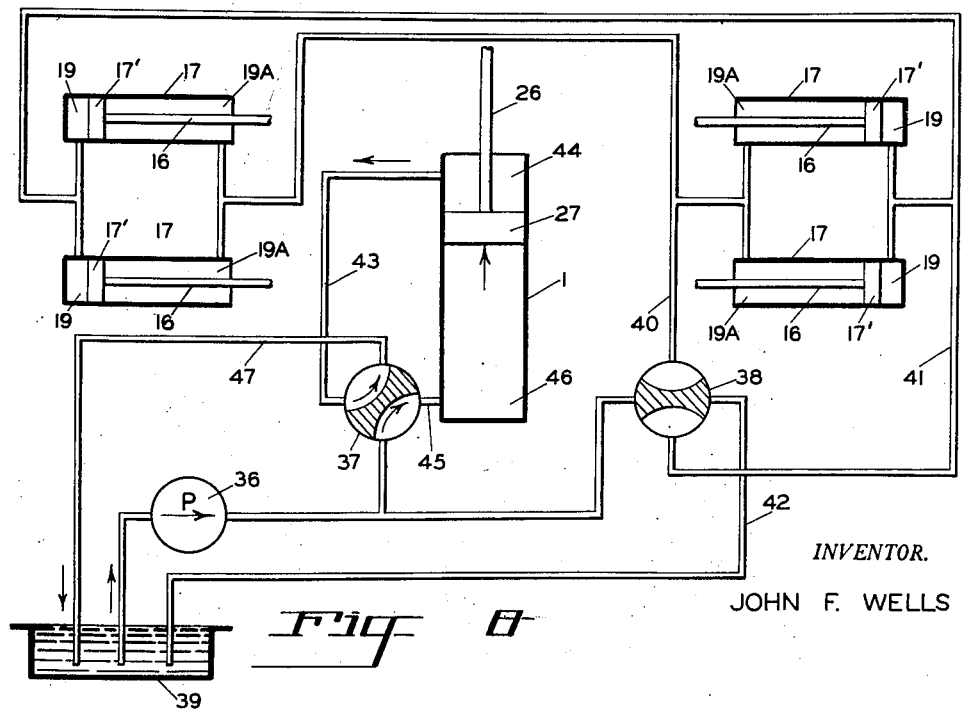
INVENTOR.
JOHN F. WELLS & nbsp;

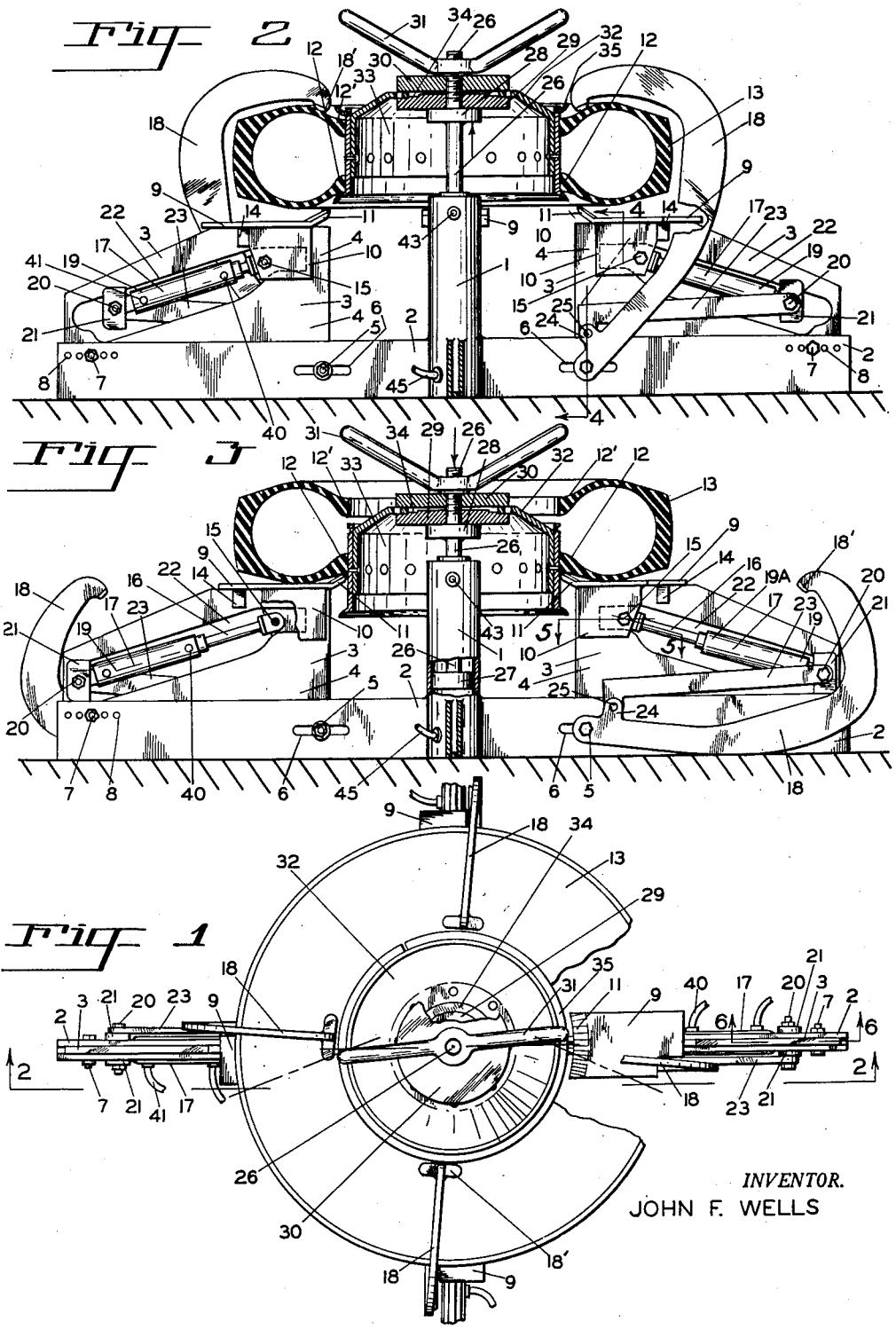

United States Patent Office 2,818,108
Patented Dec. 31, 1957

2,818,108

FLUID PRESSURE ACTUATED HEAVY DUTY TIRE MOUNTING AND DEMOUNTING DEVICE

John F. Wells, Lebanon, Oreg.

Application December 8, 1954, Serial No. 473,873

5 Claims. (Cl. 157—1.2)

This invention relates to a device for removing tires from heavy duty wheels.

The primary object of this invention is to provide a device that will remove large tires from heavy duty wheels by power means without injuring the tire or over-exerting the operator while removing the same.

In the carrying out of this object, means is provided for removing the locking ring from the wheel and tire, preferably by hydraulic power. Means is further provided for supporting the tire on supports while the wheel is being pulled, preferably by hydraulic means, down through the tire, completely removing the wheel from the tire. After the wheel and tire have been placed on the device, the tire is removed by a series of operations controlled by a central control station by the the operator.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a plan view of my new and improved device for removing tires, parts broken away for convenience of illustration;

Figure 2 is a sectional side view, taken on line 2—2 of Figure 1, illustrating how the retaining bead of the wheel is removed;

Figure 3 is similar to Figure 2, except that the device is shown in a position for pulling the wheel down through the tire in the process of removing the tire from the wheel;

Figure 4 is an enlarged fragmentary detail view of the hydraulic cylinder for supporting the wheel and tire, taken on line 4—4 of Figure 2;

Figure 5 is an enlarged fragmentary view, taken on line 5—5 of Figure 3;

Figure 6 is an enlarged fragmentary view, taken on line 6—6 of Figure 1;

Figure 7 is an enlarged fragmentary view, taken on line 7—7 of Figure 4;

Figure 8 is a diagrammatic layout of the hydraulic operating system;

Figure 9 shows a valve in position to move the tire gripping hooks to the position shown in Figure 2;

Figure 10 shows the same valve in position to move the tire gripping hooks to the position shown in Figure 3;

Figure 11 shows a second valve in position to force the tire supporting hydraulic piston down, and Figure 12 shows said second valve in a position to hold the tire supporting hydraulic piston stationary.

Referring more specifically to the drawings:

The device consists of a vertically positioned central hydraulic cylinder 1. Secured to and forming part of the cylinder are horizontally disposed feet 2. These feet are channel shaped and provide a supporting base for the hydraulic cylinder 1 and are adapted to receive movable frames 3, made of relatively heavy sheet metal. The inner ends 4 of the frames 3 are secured within the feet 2 by cross pins 5, which operate within slots 6 formed in said channels. The opposite or outer end of each frame 3 is supported by a bolt 7, which is adjustable within any one of the holes 8 formed within the channel shaped legs 2. By removing the bolts 7 the frames 3 can be moved towards or away from the hydraulic cylinder 1 which is located at the center of the device, depending upon the size of wheels and tires being operated upon.

Slidably mounted on the top of the frames 3 are plates or shoes 9. These shoes have downwardly extending legs 10 which are adapted to straddle the inner ends 4 of the frames 3, as best illustrated in Figure 2. These shoes 9 have upwardly turned toes 11 on their inner ends, which are adapted to engage the lower bead 12 of the tire 13.

The outward movement of the shoes 9 is limited by the stops 14 formed on the frames 3. Pivotally connected at 15 to legs 10 are connecting rods 16, which operate within the hydraulic cylinders 17, having the usual pistons 17' connected to their inner ends.

Hooks 18 are pivotally connected to the cross pins 5 and are adapted to move from the position shown in Figure 3 to the position shown in Figure 2 through the action of the hydraulic cylinders 17. The outer ends of the cylinders are pivotally connected to cross pins 20, which have guides 21 embracing the pivot connection on the end of the cylinder 17, said guides also embrace the sides of the frames 3. This maintains the cylinder in line with its respective frame 3.

Each frame 3 has a cut-out portion 22 in which the cylinder 17 operates. A connecting rod 23 is pivotally connected to the cross pin 20 at its one end and to the bell crank portion 24 at its opposite end by way of the wrist pin 25. The operation of the cylinder 17, the hooks 18 and the shoes 9 will be more fully described later.

I will now describe how the wheel is mounted and operated in regards to the cylinder 1. A piston rod 26 and piston 27 operate within the cylinder 1. A collar 28 is fixedly secured to the upper end of the piston rod 26, the piston rod extending up through clamping rings 29 and 30. A wing nut 31 is threaded on the upper end of the piston rod 26 and is adapted to clamp the disk 32 of the wheel 33 between the said clamping rings 29 and 30, as best illustrated in Figures 1, 2 and 3.

The ring 29 has a series of shoulders 34 adapted to fit the various sized openings in the wheel disk 32, centering the said wheel accurately in regards to the center of the machine. The wheel 33 has the usual locking ring 35 for holding the bead 12' of the tire 13 to the wheel.

Referring to Figure 8, a fluid pump 36 is employed to furnish fluid under pressure to the various cylinders through the control valves 37 and 38. A fluid sump 39 is provided for supplying liquid to the said pump and receiving return overflows from the hydraulic cylinders in their operation.

Fluid under pressure is delivered to the cylinders 17 by way of the fluid lines 40 from the control valve 38 to the inner ends 19A of the cylinder 17, while fluid is delivered through the fluid lines 41 to the opposite or outer ends 19 of the cylinder 17. A return line 42 connects the control valve 38 with the sump 39.

Fluid under pressure is delivered from the control valve 37 through the fluid line 43 to the upper end 44 of the cylinder 1, while fluid under pressure is delivered from the fluid line 45 to the lower end 46 of the cylinder 1. The fluid line 47 delivers the overflow from the cylinder 1 by way of the control valve 37 back to the sump 39.

I will now describe the operation of my device for removing tires from heavy duty wheels. The wing nut 31 and ring 30 are removed from the upper end of the piston rod 26, the wheel 33 is then placed over the supporting clamping ring 29, the wheel being brought to a horizontal position and handled by any suitable means, as for instance a hoisting device, or the machine may be installed level with the floor line, which would permit the wheel to be rolled over on to the piston rod 26. The locking ring 30 and wing nut 31 are then replaced, tightening the same down on to the hub or disk 32 of the wheel 33, securely holding the same to the upper end of the piston rod 26.

I have not attempted to show the hose connections from the control station, but there would be a control station adjacent the machine, including the control valves 37 and 38. In order to first remove the locking ring 35 from the wheel 33, the hooks or arms 18 are brought to the position shown in Figure 2, their tips 18' contacting the upper bead 12' of the tire 13. The arms or hooks are made to take this position by rotating the control valve 38 from the position shown in Figure 8 to the position shown in Figure 9. This will cause fluid to flow from the pump 36 through the valve 38 into the fluid line 40, causing fluid to enter the ends 19A of the cylinders 17 and pull the connecting rods 16 inwardly of the cylinders and will pull the shoes 9 to the position shown in Figure 2 against the stops 14.

When this happens the piston rods 16 are dead-ended. The pressure against the pistons 17' will pull the cylinders from the position shown in Figure 3 to that shown in Figure 2, together with the cross pins 20, connecting rod 23, forcing the bell crank 24 of the hooks 18 towards the machine as illustrated in Figure 2.

When the tips 18' of the hooks reach the position shown in Figure 2, the valve 38 is returned to the position shown in Figure 8 locking the pistons 17' within the cylinders 17 in this position until further action is required. When the hooks 18 have reached the position shown in Figure 2, the valve 37 is moved to the position shown in Figure 8. This will permit fluid to flow from the pump 36 through the valve 37 into the line 45, which will raise the piston 27 and piston rod 26, together with the wheel 33, forcing the bead 12' away from the locking ring 35, permitting easy removal of said locking ring.

The next operation necessary for removing the wheel from the tire is illustrated in Figure 3. The first step is to actuate the piston 27 so that the shoes 9, and particularly the toes 11 thereof, are substantially in alignment with the space between the lower bead 12 of the tire and the wheel flange immediately adjacent thereto. The valve 38 is moved to the position shown in Figure 10, which will cause fluid to flow from the pump 36 into the fluid line 41 into the ends 19 of the cylinders 17, forcing the pistons 17' away from the ends 19, causing the cylinders 17 to take the position shown in Figure 3, as well as the shoes 9.

The toes 11 of the shoes 9 enter between the bead 12 of the tire and the flange of the wheel 33. When this happens the valve 38 is again returned to the position shown in Figure 8 and the valve 37 is moved to the position shown in Figure 11. This will cause fluid from the pump 36 to pass through the valve 37 into the fluid line 43 and on to the top of the piston 27 of the cylinder 1, which will pull the piston rod 26 down and pull the wheel 33 down through the tire, as shown in Figure 3. The position of the piston 27 can be stopped and held stationary by moving the valve 37 to the position shown in Figure 12.

The tire can be replaced on the wheel by the operation of the valves 37 and 38 and force it down over the wheel by positioning the hooks as shown in Figure 2 and raising the piston rod 26 of the cylinder 1 underneath the tire which tire is resting upon the shoes 9.

Although a certain specific embodiment of the invention has been shown and described, it is obvious that many modifications thereof are possible. The invention, therefore, is not to be restricted except in so far as is necessitated by the prior art and by the spirit of the appended claims.

What I claim is:

1. A device for removing a tire from the wheel comprising a centrally disposed jack for supporting a wheel and having means for securing a wheel thereto, radially disposed feet projecting from the base of the jack, frames having their lower ends secured to said feet, shoes slidably mounted on the top of said frames, upwardly turned toes on the inner ends of the shoes to engage the lower bead of the tire, hooks pivotally connected to the feet, power means for operating said hooks to engage the upper bead of the tire, and power means for selectively operating the centrally disposed jack in opposite directions for engaging said hooks with said tire and pushing the hub of the wheel to separate the corresponding side of the tire from the wheel flange and for engaging the tire against said shoes and pulling the hub of the wheel down through the tire, thereby removing the tire from the wheel.

2. The device set forth in claim 1, said feet comprising channels receiving the lower ends of said frames, bolt and slots connections to adjustably secure the frames in said channels, and cut-out portions in said frames for receiving the power means for operating the hooks.

3. The device set forth in claim 2, said power means comprising hydraulically operated pistons and piston rods to operate the hooks and the centrally located jack, the first mentioned power means including rods having their lower ends pivotally connected to the hooks and their upper end pivotally connected to the cylinders.

4. A device for removing a tire from the wheel comprising a centrally disposed jack for supporting a wheel and having means for securing a wheel thereto, radially disposed feet projecting from the base of the jack, shoes having upwardly turned toes on the inner ends thereof, means on said feet and movably supporting said shoes for engaging the toes thereof with the lower bead of the tire, hooks pivotally connected to the feet engageable with the upper bead of the tire, power means for operating said hooks to engage the upper bead of the tire, and power means for operating the centrally disposed jack selectively in opposite directions for first engaging the hooks against the upper bead and pushing the hub of the wheel to separate such upper bead from an associated locking ring and permit removal thereof and then for engaging the lower bead against the shoes and pulling the hub of the wheel down through the tire, thereby removing the tire from the wheel.

5. A device for removing a tire from a wheel comprising a base, power means mounted on said base, mounting means having mechanism for rigidly attaching a wheel thereto, said mounting means being connected to said power means, control means connected to said power means for selectively moving the mounting means in opposite directions, first and second abutment means carried by said base and spaced longitudinally of the movement of said mounting means for engaging opposite sides of a wheel mounted tire respectively as the mounting means is moved in opposite directions, each abutment means being movable between operative and inoperative positions, and second power means interconnecting said abutment means for moving one abutment means into operative position while moving the other abutment means into inoperative position and vice versa.

References Cited in the file of this patent

UNITED STATES PATENTS

| | | |
|---|---|---|
| 2,034,819 | Maulis | Mar. 24, 1936 |
| 2,469,723 | Greene | May 10, 1949 |
| 2,500,285 | Horton et al. | May 14, 1950 |
| 2,513,756 | Smyser | June 4, 1950 |
| 2,546,900 | Miller et al. | Mar. 7, 1951 |
| 2,609,039 | Henderson | Sept. 2, 1952 |
| 2,647,564 | Douglass | Aug. 4, 1953 |